United States Patent
Rudd et al.

[11] Patent Number: 5,821,527
[45] Date of Patent: Oct. 13, 1998

[54] METHOD AND APPARATUS FOR EXPOSURE CONTROL IN LIGHT-BASED MEASUREMENT INSTRUMENTS

[75] Inventors: Eric P. Rudd, Hopkins; Timothy A. Skunes, Mahtomedi, both of Minn.

[73] Assignee: CyberOptics Corporation, Golden Valley, Minn.

[21] Appl. No.: 870,766

[22] Filed: May 16, 1997

Related U.S. Application Data

[62] Division of Ser. No. 587,399, Jan. 17, 1996, Pat. No. 5,665,958, which is a division of Ser. No. 232,738, Apr. 25, 1994, Pat. No. 5,519,204.

[51] Int. Cl.⁶ ................................................. G01J 1/32
[52] U.S. Cl. ............................ 250/205; 315/151; 372/29
[58] Field of Search ............................ 250/205; 315/151, 315/156, 158; 372/9, 29, 38

[56] References Cited

U.S. PATENT DOCUMENTS

| | | |
|---|---|---|
| 3,679,307 | 7/1972 | Zoot et al. . |
| 3,986,774 | 10/1976 | Lowrey, Jr. et al. . |
| 4,040,738 | 8/1977 | Wagner . |
| 4,183,672 | 1/1980 | Raber et al. . |
| 4,660,955 | 4/1987 | Ishid et al. . |
| 4,733,969 | 3/1988 | Case et al. . |
| 4,864,147 | 9/1989 | Ikari et al. . |
| 4,872,747 | 10/1989 | Jalkio et al. . |
| 4,891,772 | 1/1990 | Case et al. . |
| 4,927,266 | 5/1990 | Sugiura et al. ......................... 250/205 |
| 5,005,978 | 4/1991 | Skunes et al. . |
| 5,089,748 | 2/1992 | Ihms ........................................ 315/151 |
| 5,123,023 | 6/1992 | Santarelli et al. ........................ 372/38 |
| 5,133,601 | 7/1992 | Cohen et al. . |
| 5,136,148 | 8/1992 | Nonaka . |
| 5,362,970 | 11/1994 | Pryor et al. . |
| 5,519,204 | 5/1996 | Rudd et al. ............................. 250/205 |
| 5,665,958 | 9/1997 | Rudd et al. ............................. 250/205 |

FOREIGN PATENT DOCUMENTS

4108944A1 9/1992 Germany .

OTHER PUBLICATIONS

Optical Gaging Products, Inc., Product Literature, "Smart Scope", Video Measuring Microscope; Jul. 1993.
Optical Gaging Products, Inc., Product Literature, "IQ", The Intelligent Qualifier Coordinate Measuring System; Aug. 1993; pp. 1–20.

*Primary Examiner*—Stephone B. Allen
*Attorney, Agent, or Firm*—Patterson & Keough, P.A.

[57] ABSTRACT

A method and apparatus for nearly instantaneous and wide dynamic range exposure control in light-based measurement instruments. The excess charge drained from a CCD array by anti-blooming circuitry is effectively monitored and distinguished from leakage current. Detection of the drained charge generates a signal to deactivate the light source exposing the CCD array. The exposure control device includes a unique circuit for detecting the operating state of an anti-blooming circuit associated with a CCD array, and a unique laser light driver that ramps up the light intensity of the laser light source in an approximately exponential manner.

4 Claims, 8 Drawing Sheets

EXPOSURE CONTROL CHARGE DETECTOR DIAGRAM

LASER DRIVER

METHOD AND APPARATUS FOR EXPOSURE CONTROL IN LIGHT-BASED MEASUREMENT INSTRUMENTS

This is a Division of application Ser. No. 08/587,399, now U.S. Pat. No. 5,665,958, filed Jan. 17, 1996, which in turn is a Division of 08/232,738 filed Apr. 25, 1994, now U.S. Pat. No. 5,519,204 issued May 21, 1996.

TECHNICAL FIELD

The disclosed invention relates to non-contact metrological instruments. In particular, it relates to a method and apparatus for nearly instantaneous and wide dynamic-range exposure control in light-based measurement instruments. More specifically, the disclosed embodiment of the invention relates to the control of laser light exposure in non-contact sensors which optically measure the distance from a sensor head to a test surface.

BACKGROUND ART

Non-contact, laser-based point and line range sensors are disclosed in U.S. Pat. No. 4,733,969, Laser Probe for Determining Distance; U.S. Pat. No. 4,872,747, Use of Prisms to Obtain Anamorphic Magnification; U.S. Pat. No. 4,891,772, Point and Line Range Sensors; all of the cited patents being owned by the assignee of the present invention.

Laser-based measuring instruments are an improvement over conventional contact measurement devices that use, for instance, ruby-tipped contact probes. Contact probes are incrementally moved toward a surface to be detected by co ordinate-measuring machines (CMMs). The precision of CMMs is limited by the diameter of the small ruby sphere attached to the end of the contact probe, and contacting probes cannot be used to measure flexible parts such as thin metal pieces, plastics, liquids, or other soft, deformable materials. Furthermore, contacting probes must be continually retracted and redeployed so that the probe is not dragged along the surface of the piece being measured.

Laser-based measuring instruments are disclosed in the above-referenced patents. The systems disclosed in the referenced patents are an improvement over previous laser-based systems, and use prisms to effect anamorphic magnification of the reflected light beam. The use of anamorphic magnification provides a substantially more compact system for a given standoff distance, while maintaining substantially higher light levels at the light sensor than was obtainable with previous, non-anamorphic systems. Reflected light intensity in laser-based measurements systems is a function of the surface reflectivity of the object being measured, and can vary over a wide dynamic range, on the order of 1,000,000:1. The system referenced in U.S. Pat. No. 4,891,772 employed optical RAMs as light sensors, and included software based exposure control to compensate for the wide range of light intensity to which the optical RAMs were exposed.

The correctness of the exposure in previous optical RAM systems could be judged only after the exposure had been terminated. This necessitated a trial-and-error approach to exposure control, the exposure time being adjusted on successive trials until a satisfactory exposure had been achieved (bracketing). The time required to take such successive exposures slowed the overall operation of the measurement system.

The problems posed by trial-and-error approaches to exposure control were exacerbated when the measurement system was mounted on a mechanical scanning device meant to be operated in a continuous motion mode. Because the time required to obtain a correct exposure reading was unknown in advance, the scanning device needed to be stopped until the series of bracketing exposures was complete. In addition to the obvious slowing of the overall operation, mechanical hysteresis effects inherent to the start and stop operations injected error into the determination of the mechanical position of the sensing head.

CCD arrays offer an alternative light sensor to the optical RAMs used in previous laser-based measuring instruments. In fact, the widespread use of CCD arrays (for instance in facsimile machines) has driven the cost of CCD arrays down to levels where the use of CCDs in place of optical RAMs could provide significant cost benefits. CCD arrays have the further advantage of providing a gray-scale image, as opposed to the binary image obtainable from an optical RAM. Gray-scale images provide much more information about the structure of the viewed object, and enable more sophisticated analysis. CCD sensors that have potential for application in laser-based measuring instruments are described in the 1992 Databook, Dalsa Inc., Waterloo, Ontario, Canada, and the 1991 Databook, Loral Fairchild Imaging Sensors, Milpitas Calif. These manuals also have many application notes and other useful information.

While the use of CCD arrays in laser-based metrological instruments offers certain advantages, the dynamic range of CCD arrays is limited. The manufacturer-claimed dynamic range of 5000:1 for CCD arrays is obtainable only under ideal conditions. Even this dynamic range is nowhere near the range needed for many sensing applications, where return light levels can easily vary over a 1,000,000:1 range. It will be appreciated that overexposure of a CCD array leads to clipping, which causes the brightness gradations in the highlights of the image to be lost. Underexposure of a CCD array results in images that are heavily contaminated by noise. The potential advantages provided by CCD arrays cannot be realized without effectively solving the problems presented by the inherent limited dynamic range of CCDs.

A non-contact, light-based measurement device that incorporated the advantages of CCD sensors while overcoming the limitations presented by the limited dynamic range of CCD arrays, and which could at the same time reduce or eliminate the time required to effect control of sensor exposure, would provide decided advantages over known metrological instruments.

SUMMARY OF THE INVENTION

The problems outlined above are in large measure resolved by the method and apparatus for exposure control in CCD-based instruments in accordance with the present invention. The invention is particularly useful in conjunction with laser-based point-and line-range measurement sensors, but could be adapted for use with any CCD-based system.

The apparatus in accordance with the invention employs anti-saturation circuitry for preventing the light sensor from saturating, detection circuitry for detecting anti-saturation activity, and a feedback circuit for controlling the operation of the light source in response to the anti-saturation activity. Although, in the preferred implementation, the exposure is terminated by turning off the light source, it will be appreciated that this scheme can be made to work even without controlling the light source, by terminating the exposure some other way. For instance, transfer of the image from the photosites to the shift registers will terminate the exposure. In the particular embodiment described, a diode laser light source is used to project light onto a test object, and a CCD array is used as a light sensor. Anti-blooming circuitry integral to the CCD array yields a charge on an external pin of the CCD array at the onset of saturation, and this extremely small charge is effectively detected. For a discussion of typical anti-blooming circuitry supplied on CCD sensors, see the application note "Anti-Blooming and Integration Control," 1991 Databook, Loral Fairchild Imaging Sensors, Milpitas Calif., pp.334–336. The intensity of the laser light source is ramped up over time by a unique laser driver circuit, and exposure time is controlled in accordance with the charge induced by the anti-blooming circuitry. The method in accordance with the invention includes the detection of anti-saturation activity in the light sensor of a light-based measurement system, and control of the exposure as a function of the detected anti-saturation activity. The big advantage of this scheme is that a correct image is obtained after a single exposure; no trial-and-error bracketing is necessary. This greatly increases image-gathering speed. Furthermore, with proper control of the light source in accordance with the invention, this speed can be obtained without compromise of the dynamic range.

The invention is particularly useful with triangulation range-sensing systems used to measure the distance to a target in an industrial setting. A prime use of such triangulation range sensing devices is to measure the height of solder paste blobs on surface-mount printed-circuit boards. Other uses include the digitization of prototype models to facilitate the manufacturing of production pieces. The sensing head in such an application would be mounted on a precision xyz stage and moved around the object. Triangulation range sensing devices are also useful in the measurement of depths of grooves, textured surfaces and the like.

DETAILED DESCRIPTION OF THE DRAWINGS

Figure 1:
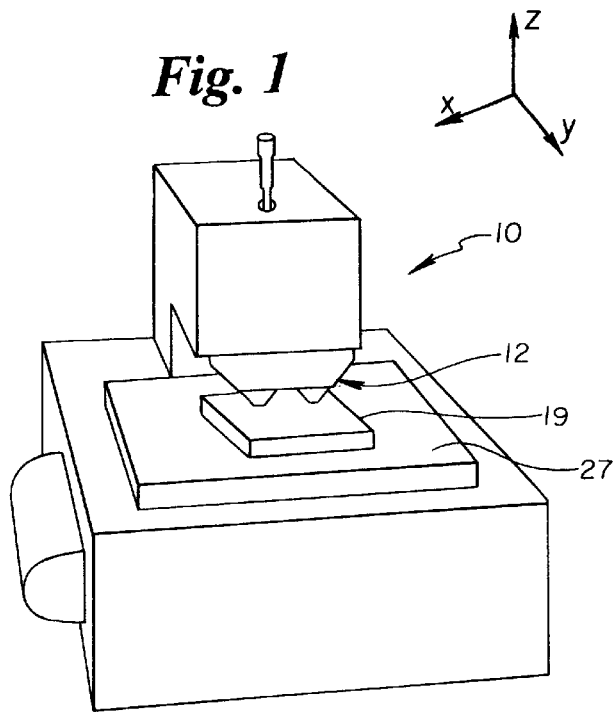
FIG. 1 is a perspective view of a non-contact data acquisition and measurement system.

Referring to the drawings, FIG. 1 depicts a non-contact data acquisition and measurement system 10 having a laser-based sensor head 12. Object 19 under inspection is fixtured to platen 27. Platen 27 is translated in x and y axes. Triangulation sensor 12 measures height of object 19 in z axis. Knowledge of xy platen position and z height at many xy locations gives full three-dimensional information about object 19.

Figure 2:
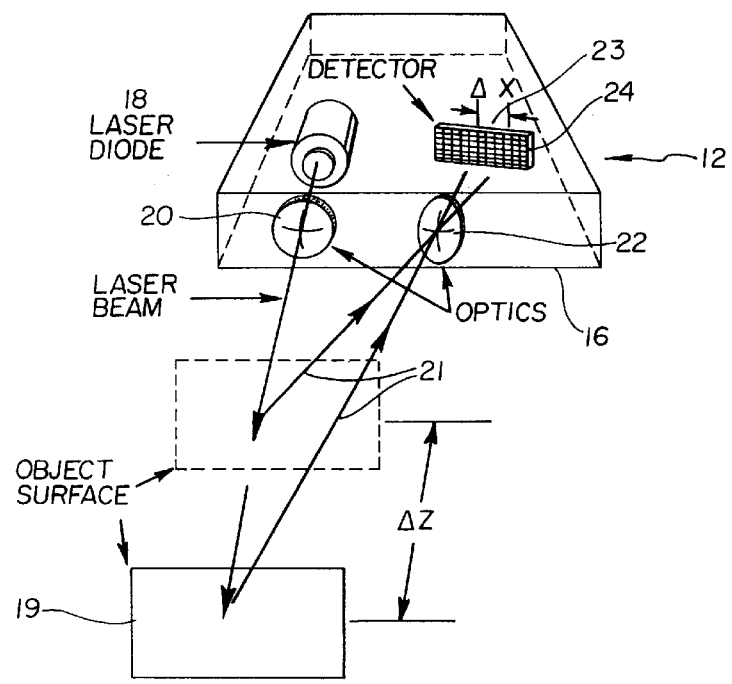
FIG. 2 is a schematic view of a triangulation range sensor suitable for use in the non-contact data acquisition and measurement system of FIG. 1.

Referring to FIG. 2, the sensor head 12 is a triangulation range sensing system having a machined aluminum case 16. The case 16 measures approximately 100×80×25 mm in size. A diode laser 18, focusing lens 20, receiver optics 22 and detector 24 are housed within case 16. The diode laser 18 and detector 24 are coupled to electronics (not shown in FIG. 2) mounted on a printed circuit board inside the case 16.

Light from the diode laser 18 is focused to a small spot (typically 25 $\mu$m) on an object 19 to be measured. Reflected light 21 from object 19 passes through the receiver optics 22 and is finally focused to image spot 23 (typically 400 $\mu$m) on CCD array detector 24. The location of the detector image depends on the distance from the object 19 to the sensor head 12. The detector produces a signal which is electronically measured to determine the location of the image spot 23. Since the geometry of the optics in the sensor head 12 is known, the location of the image spot 23 has a known relationship to the distance between the object 19 to the sensor head 12.

Figure 3:
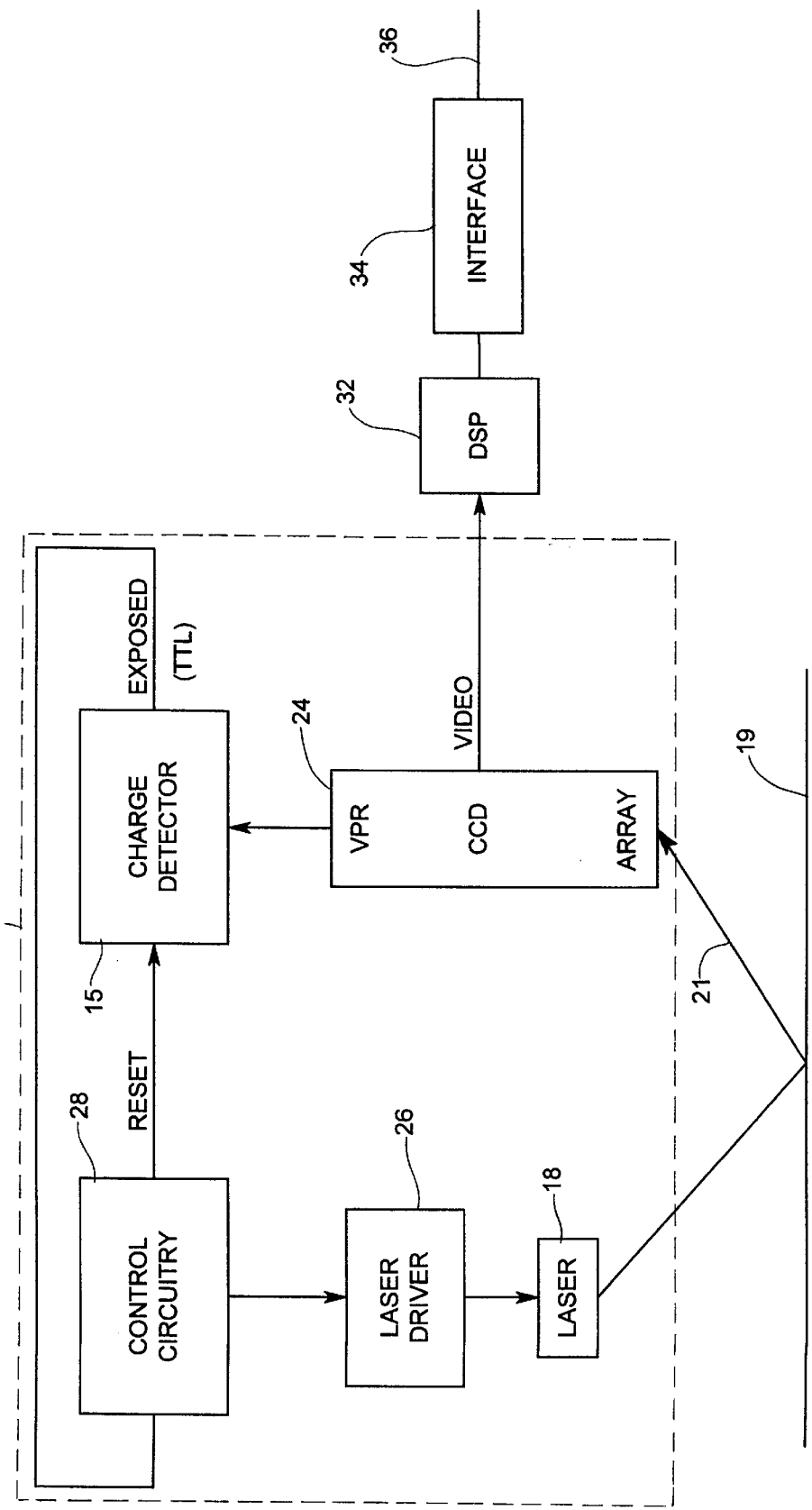
FIG. 3 is a block diagram of the sensor electronics in accordance with the present invention, with emphasis on the exposure control circuitry.

Referring to FIG. 3, the electronics include an exposure control circuit 14 consisting of a laser driver 26, diode laser 18, CCD detector 24, control circuitry 28 and charge detection circuitry 15. Also included are digital image-processing circuitry 32, bi-directional interface circuitry 34 and digital interface and power cable 36.

The sensor head 12 advantageously employs a CCD array as the light detector 24. Since the preferred implementation uses the CCD array in an unconventional manner, it is appropriate to review the internal operation of a CCD array. As will be appreciated by those skilled in the art, a CCD array includes multiple photosensitive regions (called photosites) and a means of serially shifting out the signals from the photosites (called the CCD shift register). Each of the photosites can be considered as a pixel. When light falls on the photosites, negative electrical charge accumulates in proportion to the amount of light received, much as rain might accumulate in an ice cube tray. Upon command, the charge accumulated on the photosites can be sent through the shift register; the signals corresponding to the amount of light received by each photosite then appear in sequence on the video output pin of the CCD array.

If a pixel in a CCD array is overexposed, a phenomenon known as blooming can occur. If one photosite has overexposed, not only does the readout from that pixel clip (or limit) in amplitude, but the excess charge, having nowhere else to go, spills over (or blooms) onto nearby pixels. Overexposed regions of a CCD image are accordingly not only clipped in amplitude, but are broadened and smeared as well. Continuing the ice cube tray analogy, if one cube in the tray has filled completely, any excess water (charge) will spill over onto nearby cubes (photosites).

Figure 4:
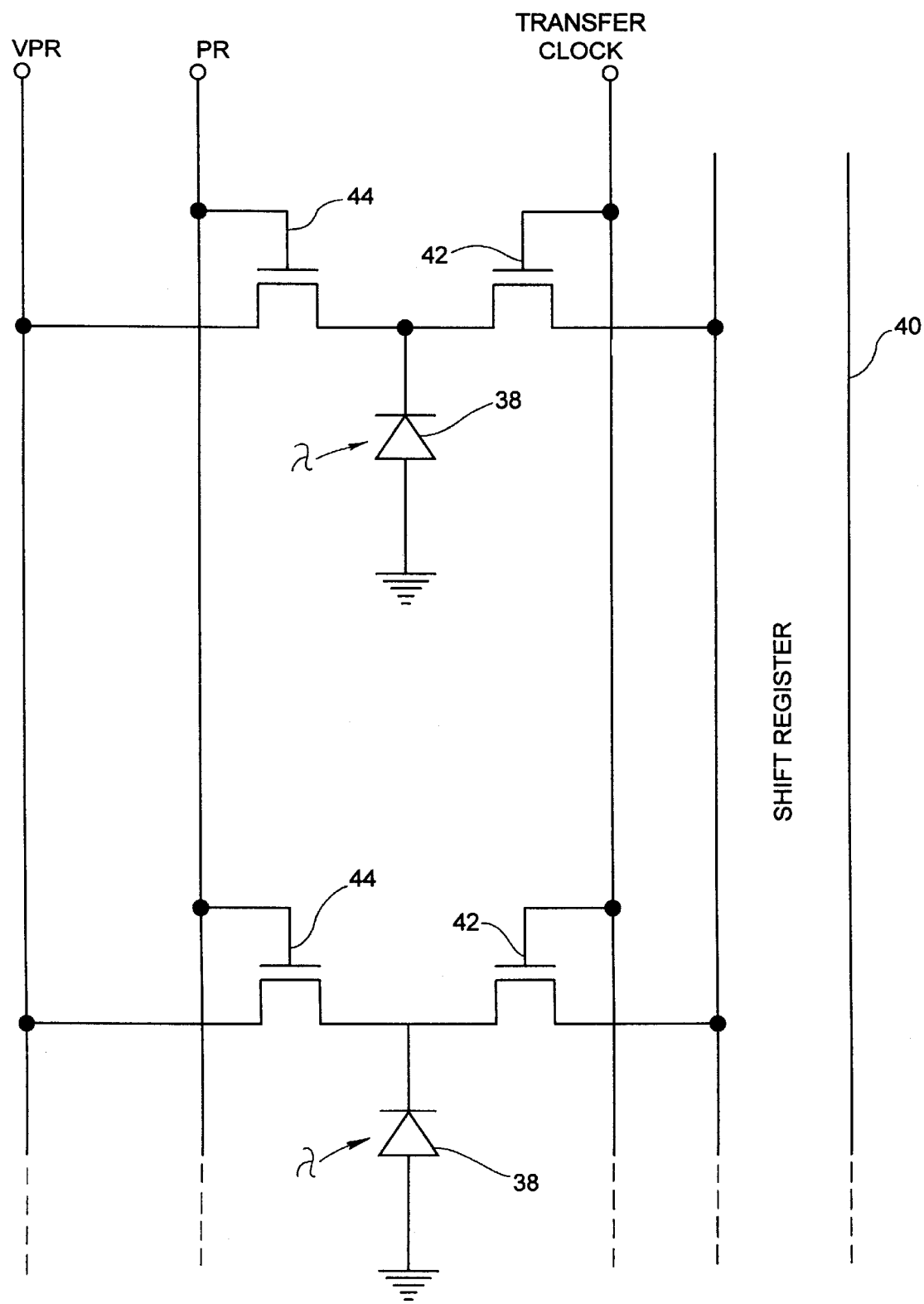
FIG. 4 is a schematic diagram of several of the photosites of a CCD array and an associated output shift register, depicting the anti-blooming circuitry for each photosite.

CCD arrays are sometimes provided with special circuitry to alleviate the blooming problems just discussed. FIG. 4 shows the schematic diagram of a typical anti-blooming circuit. Referring to FIG. 4, each diode 38 represents one of the many photosites of a CCD array. The photosites 38 are individually connected to CCD shift register 40 by MOSFET transistors 42, actuated by transfer clock TCK. Photosites 38 are also connected to external pin VPR by MOSFET transistors 44. The gates of MOSFETs 44 are connected to external pin PR. It will be understood that actual CCD arrays have more than two pixels (the CCD array in the preferred implementation has 512), but two are enough to explain the essential features of the circuitry.

Again referring to FIG. 4, transistors 44 are the key elements of an anti-blooming circuit that prevents photosites 38 from saturating. In operation, the voltage on each photosite 38 starts out at as a positive voltage (for instance 5 V). When light falls on a photosite, the photocurrent discharges the capacitance of the photosite, and the voltage decreases. When the voltage gets down to, for instance, 3 V, the photosites saturate and blooming occurs. However, if the voltage at pin PR is held at a proper value, saturation of the photosite can be prevented.

More particularly, if photosite voltages become significantly more negative than PR, MOSFETs 44 will begin to conduct. For instance, assume that this differential voltage (called the gate-source threshold voltage) is 2 V. Then, if PR is held at 6 V, MOSFETs 44 will begin to conduct if the voltages on their respective photosites drop to less than 4 V. This voltage is sufficiently high to prevent blooming from occurring. The excess negative charge removed from the photosites flows into VPR. In terms of the ice cube tray analogy, the anti-blooming circuitry could be thought of as a hole drilled in the side of each cube in the tray. When sufficient water accumulates in a cube, it runs out through the hole in the cube; the water from all the cubes is collected by VPR. Thus the cubes never spill over, since they never fill completely.

Figure 5:
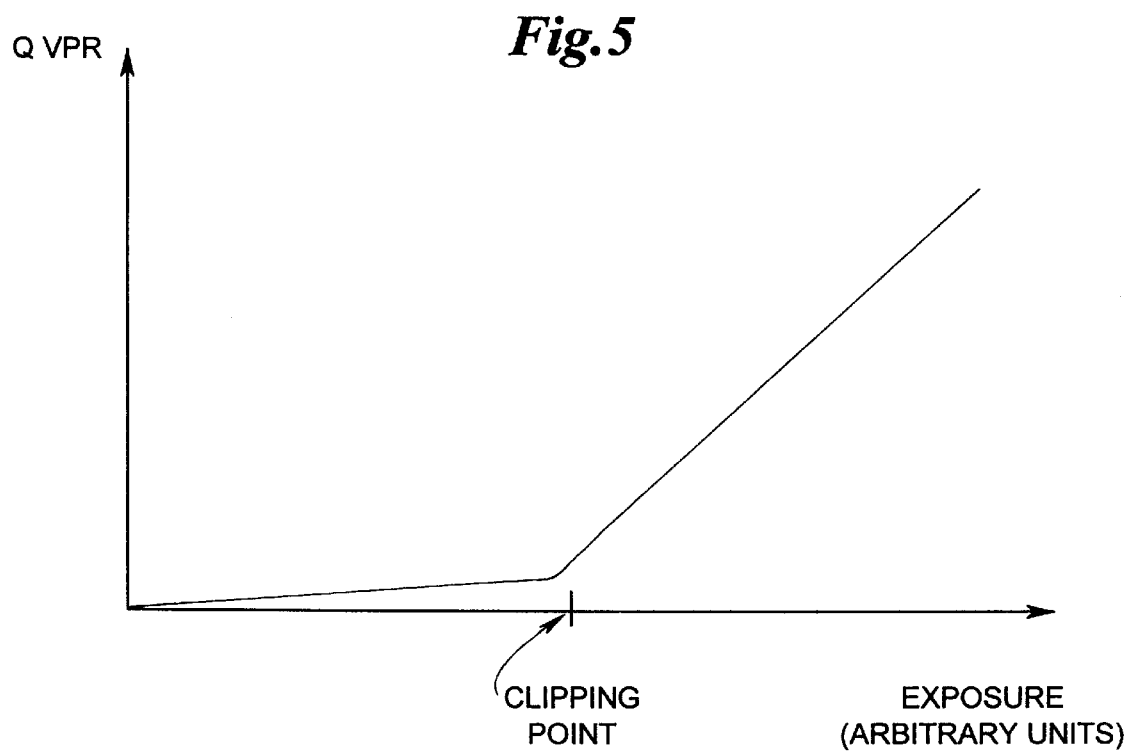
FIG. 5 is a graph of charge output of the anti-blooming circuitry as a function of exposure.

The charge collected by pin VPR is graphed in FIG. 5. Until the onset of overexposure, the charge collects on photosites 38 and thus the charge seen on pin VPR remains small; after the onset of overexposure, the charge begins to accumulate at a rate proportional to the light intensity.

The present invention employs the anti-blooming circuitry associated with a CCD array in a unique way to control the exposure of the array. In the conventional use of the anti-blooming circuitry, pin VPR is connected to the positive power supply line, where the small negative charge received from pin VPR has no significant effect. However, since the received charge at pin VPR increases sharply at the onset of overexposure, this suggests that the exposure could be controlled by measuring the charge at VPR, and deactivating the laser light source when this charge indicates saturation at some of the pixels. However, the extremely small charges generated by the anti-blooming circuitry, and the requirement to provide exposure over extremely large dynamic ranges, complicate implementation of exposure control based on the operation of anti-blooming circuitry. The present invention provides unique circuitry for detecting the charge generated by the operation of a CCD array anti-blooming circuit, and also provides a unique laser light source driver that enables exposure of a CCD array over a wide dynamic range. It will be appreciated that much of the exposure control circuitry could be implemented on the CCD integrated circuit, which would offer good immunity from external noise and interference.

The charge generated by operation of the anti-blooming circuitry is typically only in the magnitude of about 0.5 pC. The integration time in the preferred implementation can be as long as 10 ms, which results in an average current flow of as little as (0.5 pC)/(10 Ms) =50 pA. This level is comparable to the stray leakage into pin VPR from various sources. This leakage must therefore be compensated in any successful implementation of the scheme just described. Leakage currents typically vary greatly with temperature and humidity, which renders any fixed compensation schemes ineffective.

Figure 6:
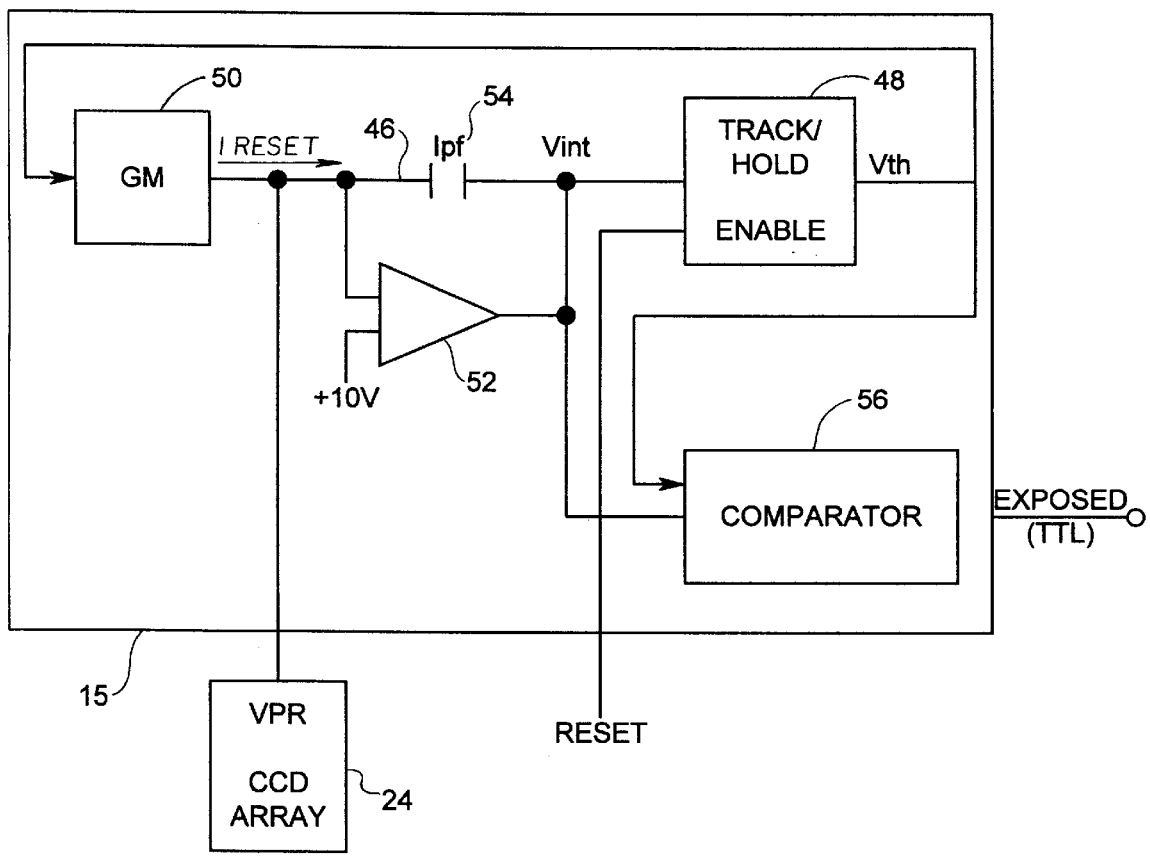
FIG. 6 is a block diagram of the charge detector circuit of exposure control apparatus depicted in FIG. 3.

The charge detection circuitry 15 (which appears in block form in FIG. 3, and in schematic form in FIG. 6) addresses these problems. Charge detection circuit 15 includes an integrator 46, track/hold integrated circuit 48, comparator 56, and transconductance ($g_m$) block 50.

Integrator 46 is constructed of op-amp 52 (part number OPA637, from Burr-Brown Corp., Tucson Ariz.) and capacitor 54. Capacitor 54 has a small value such as 1 pF, and can be made from appropriately-sized pads on two adjacent printed circuit board layers. A +10-V pseudo-ground establishes the reference point for most of the charge detection circuitry. The output of integrator 46 is connected to track/hold circuit 48, whose output is fed back to the integrator input through $g_m$ block 50. The differential signal between the input and output of the track/hold is fed to the comparator 56.

Since the VPR pin of the CCD array is operably coupled to the photosites, which are positively biased, the desired current will not flow unless VPR is connected to a potential significantly more positive than that of the photosites. This is why a +10-V pseudo-ground is used as the reference for the charge detection circuitry. Since the integrator input tracks the pseudo-ground potential, the integrator input is thus also +10 V, which is positive enough to permit normal operation of the anti-blooming circuitry.

The action of the exposure control is intimately associated with the action of track/hold circuit 48. A track/hold circuit has the property that its output follows (or tracks) its input when its ENABLE input is asserted. When its ENABLE input is de-asserted, the output remains at (holds) the voltage it had at the instant before ENABLE was de-asserted. Thus it can be used as an analog storage element.

Figure 7:
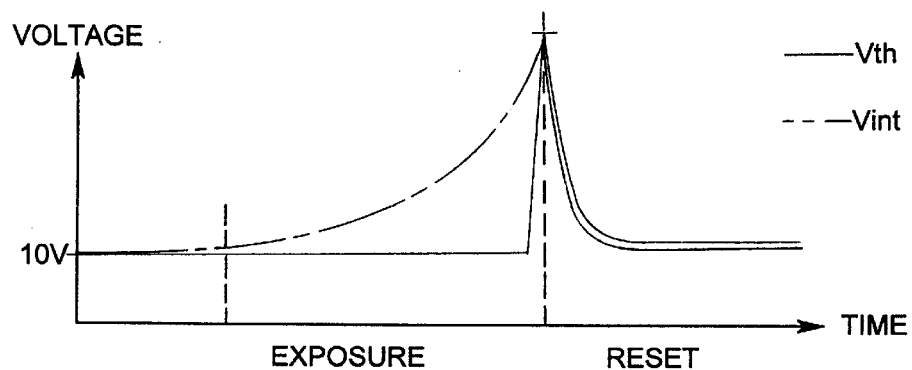
FIG. 7 is a graph of the principal waveforms associated with the circuitry of FIG. 6.

The salient waveforms of the exposure control circuitry are depicted in FIG. 7. Referring to FIG. 7, the exposure control circuit operates in two phases, reset and integrate. During reset, the track/hold circuit 48 ENABLE is asserted. This causes the track/hold circuit 48 output to track the input, thereby applying the output of integrator 46 to $g_m$ block 50. The transconductance block 50 then applies a current to the integrator input which discharges integrator capacitor 54, resetting the integrator.

It is important to note that once the circuit stabilizes, any leakage currents are also canceled. This desirable situation occurs because, by definition, equilibrium is achieved when the voltage on capacitor 54 is not changing. Since the voltage on capacitor 54 is not changing, it follows that the sum of the currents through capacitor 54 is zero. (Otherwise, it would charge.) Thus, the circuit is able to resolve anti-blooming spill-over currents smaller than the leakage currents, since they are canceled out by the action just described. Unlike a fixed compensation scheme, this method requires only that the leakage remain approximately constant during the exposure cycle, which (in the preferred implementation) lasts less than 10 ms. Temperature and humidity variations are negligible over this time period.

When an exposure is about to begin, the track/hold ENABLE is de-asserted. This causes the track/hold output to remain at the value it had just before ENABLE was de-asserted; the integrator output also remains at the value it had in reset. Track/hold 48 maintains its equilibrium value, and $g_m$ block 50 continues to cancel out any leakage currents. However, since the voltage at the input to the $g_m$ block is now constant, the circuit does not oppose any new currents. Thus, any charge from photosite saturation accumulates on capacitor 54. When the light is turned on, and some photosites saturate, charge is transferred through pin VPR, causing the integrator output to ramp up. When it reaches a pre-determined threshold, comparator 56 triggers, causing control circuitry 28 to shut off diode laser 18 and once again apply a reset to the charge detection circuit.

Unfortunately, in order to cancel out leakage, a voltage must be applied to $g_m$ block 50. This results in an offset in the equilibrium output level of the integrator. In order to make the detection scheme insensitive to this offset, the exposure comparator is connected differentially between the input and output of the track/hold. When the difference between the comparator inputs reaches a value chosen by external circuitry, the comparator switches and asserts the EXPOSED signal.

A simple resistor could, in principle, be used for $g_m$ block 50. However, in order to reset charge detection circuit 15 rapidly, a given offset voltage at the output of integrator 46 should result in a large $g_m$ current (denoted by $I_{reset}$ in FIG. 6), since this will cause the integrator output to slew rapidly. Since $g_m = I_{reset}/V_{int}$, this implies that $g_m$ should be large. Unfortunately, a large $g_m$ means that small amounts of noise affect $I_{reset}$ greatly. This would argue for a small $g_m$. However, this is not a good choice, either, since the reset time constant is $\tau = C_1/g_m$, and a small $g_m$ implies a long reset time constant, and thus a slow reset.

Furthermore a typical $g_m$ which is appropriate for this circuit is on the order of 300 p℧. This would require a resistor of value 1/(300 p℧)≈3 GΩ. Standard resistors are not available in such a high value.

Figure 8:
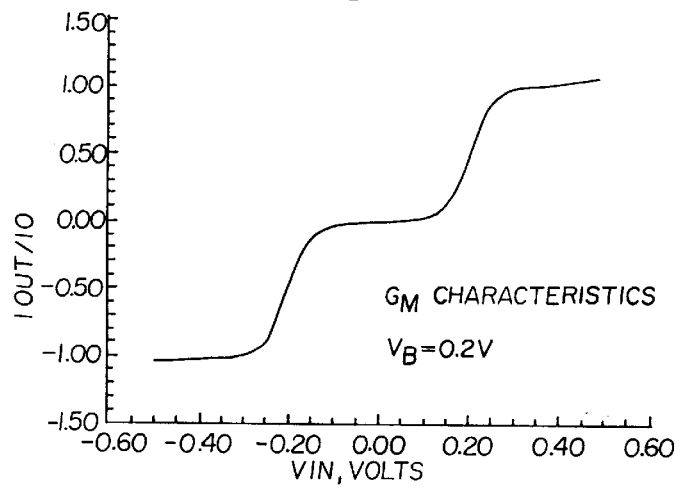
FIG. 8 is a plot depicting the transfer function of the transconductance element of the charge detector circuit depicted in FIG. 6.

To address these problems, a $g_m$ block was realized with current-starved diodes to obtain the very low $g_m$ required. A beneficial side effect is that the transconductance is nonlinear. At the beginning of the reset cycle, the voltage applied to $g_m$ block 50 is large. As plotted in FIG. 8, the effective $g_m$ (the slope of the curve) is much larger for large voltages. This has the effect of greatly speeding up the initial stages of the reset. As the circuit approaches equilibrium, the effective $g_m$ decreases, slowing the final approach of the reset accordingly, so that it will be more precise.

Figure 9:
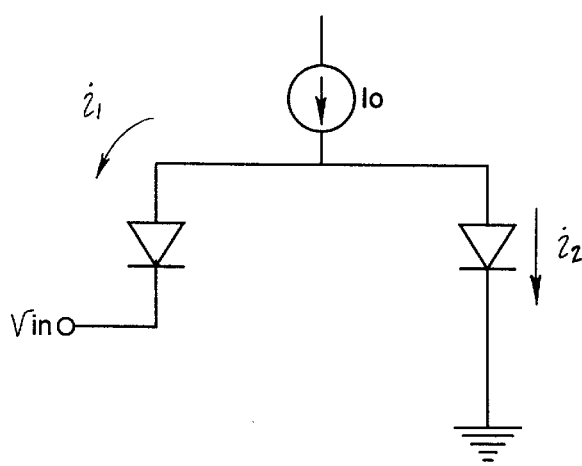
FIGS. 9 and 10 depicts diode circuits used in theoretical discussion of the transconductance element.

The operation of $g_m$ block 50 will now be discussed in more detail, with reference to the theoretical diode circuits shown in FIGS. 9 and 10. In FIG. 9 a half-bridge is depicted. The transconductance equation for a diode-connected transistor is $$i_C = I_S \exp\left(\frac{v_{BE}}{V_T}\right), \quad (1)$$

where $i_c$ is the collector current, $I_s$ is the so-called saturation current (this will soon drop out of the equations), $v_{BE}$ is the base-emitter voltage, and $V_r$ is defined by the equation $V_T = kT/q$, where k is Boltzmann's constant, q is the charge on an electron, and T is absolute temperature. (k/q has the value 86.17 $\mu$V/K; thus $V_T = 26$ mV at room temperature.) When (1) is applied to the two diode-connected transistors in FIG. 9, the ratio of currents becomes $$\frac{i_2}{i_1} = \exp\left(\frac{v_{in}}{V_T}\right). \quad (2)$$

By Kirchhoff's current law, $$I_o = i_1 + i_2. \quad (3)$$

Solving (3) for $i_1$ and substituting it into (2), it follows that $$i_2 = I_o \frac{\exp\left(\frac{v_{in}}{V_T}\right)}{\exp\left(\frac{v_{in}}{V_T}\right) + 1} = \frac{I_o}{2}\left[1 + \tanh\left(\frac{v_{in}}{2V_T}\right)\right]. \quad (4)$$

Figure 10:
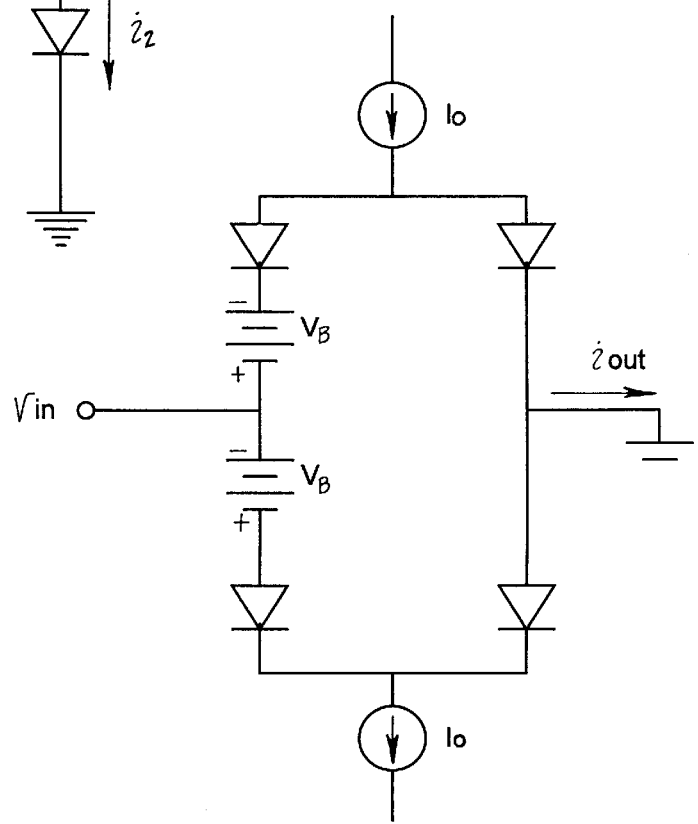

Consider now the theoretical circuit of FIG. 10. Here both halves of the bridge have been included, and $V_B$ bias voltages have been inserted into two of the legs. The current out of each half of the bridge can be calculated from (4), simply by taking into account sign changes and offsetting the input voltage by $\pm V_B$. Moreover, the total output current from the bridge in FIG. 10 is simply the sum of the output currents of the two halves. Taking into consideration these things, the output current becomes $$i_{out} = I_o\left[\frac{\exp\left(\frac{v_{in} - V_B}{V_T}\right)}{\exp\left(\frac{v_{in} - V_B}{V_T}\right) + 1} - \frac{1}{\exp\left(\frac{v_{in} + V_B}{V_T}\right) + 1}\right] \quad (5)$$

$$= \frac{I_o}{2}\left[\tanh\left(\frac{v_{in} - V_B}{2V_T}\right) + \tanh\left(\frac{v_{in} + V_B}{2V_T}\right)\right]$$

$$= I_o \frac{\sinh\left(\frac{v_{in}}{V_T}\right)}{\cosh\left(\frac{v_{in}}{V_T}\right) + \cosh\left(\frac{V_B}{V_T}\right)}$$

Typical values in the preferred implementation are: $V_B = 380$ mV; $I_o = 10$ $\mu$A. The transconductance is very low for $|v_{in}| < V_T$ (about 300 p℧), but is much larger for larger inputs. When the reset circuit is activated with this transconductance, the circuit thus rapidly settles to somewhere close to the correct offset nulling current. The time constant then lengthens as time goes on. This has the desired effect of making the precision of the reset circuit adapt to the sample rate being used. Of course, if the integration time is short, but the sample rate is low, the reset is all the more precise.

Figure 11:
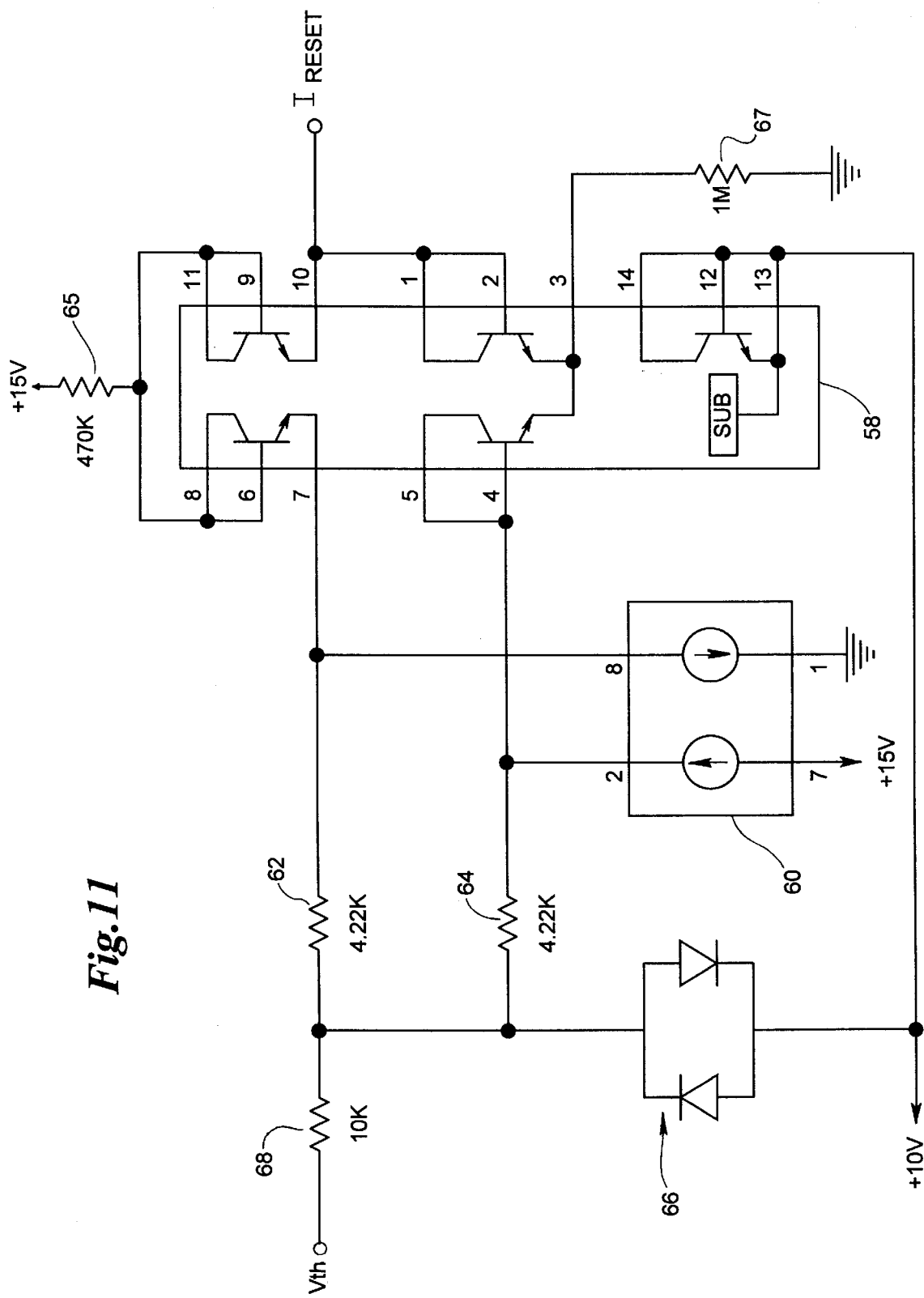
FIG. 11 is a schematic diagram of the transconductance element, as actually realized.

In the actual circuit used in the preferred implementation, shown in FIG. 11, the diodes are realized by transistor array 58 (part number CA3046, from Harris Semiconductor, Melbourne Fla.) by connecting the base of each transistor to its respective collector. The substrate (pin 13) is connected to the +10-V pseudo-ground to keep the collector-substrate leakage current on pin 1 to a minimum. The bias voltages VB are implemented by dual 100-$\mu$A constant-current source 60 (part number REF200, also from Burr-Brown Corp.) and resistors 62 and 64. The currents are very well matched, so the difference current flowing out of the common connection of resistors 62 and 64 is very small. Diode array 66 and resistor 68 form a clipping network to keep transistor array 58 from being reverse-avalanched by excessive input voltages. The currents sources in FIG. 10 are realized by resistors 65 and 67 connected to the positive supply and ground, chosen to make $I_o$=10 $\mu$A. The actual current through resistors 62 and 64 is 100 $\mu$-$I_o$, or about 90 $\mu$A. With the values listed, $V_B = 380$ mV. The network delivers its output current $I_{reset}$ into the summing node of op-amp 52, which is at +10 V.

Figure 12:
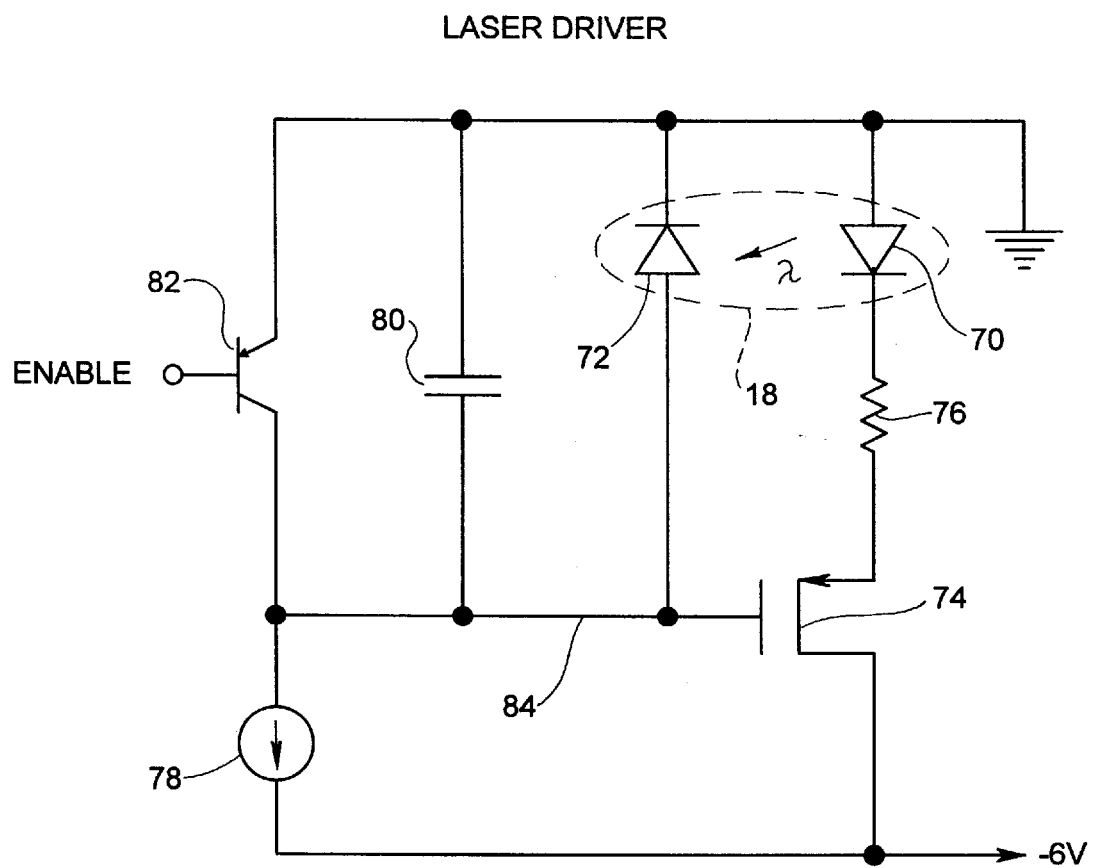
FIG. 12 is a schematic diagram of the laser driver circuit of the exposure control apparatus depicted in FIG. 3.

FIG. 12 is a schematic diagram of the laser driver circuit 26. The laser driver circuit consists of diode laser 18 (comprised of laser diode element 70 and monitor photodiode 72), p-channel MOSFET transistor 74 (connected in a source-follower configuration), ballast resistor 76, current sink 78 (which can be realized by conventional means), capacitor 80 and switching transistor 82, the base of which is connected to conventional digital level-shifting circuitry (not shown). The common connection of 78 and 80 comprises laser control node 84.

In the preferred implementation, the maximum exposure time (before being arbitrarily cut off by firmware) is typically 10 ms. Detector exposure is the integral of light intensity with respect to time. If a simple on-off laser control were used, this integral would be simply the product of the light intensity and time. For proper exposure this product must be held constant. It therefore follows that if the reflected light intensity varies over a 1,000,000:1 range from sample to sample, the necessary exposure time will vary over the same range (for the simple on-off laser control). One million times less than 10 ms is only 10 ns, which is too short a time for the charge detection circuitry in FIG. 6 to respond. To solve this problem, the laser intensity needs to be ramped up as the exposure progresses. Thus, if an extremely small exposure is needed, the end of the exposure is reached while the laser power is still very low. This allows the exposure control circuitry correspondingly more time to respond. An easily-grasped analogy would be if one were filling a vessel of unknown size from the faucet, and wanted it to spill over by no more than, say, 10%. At first, one would start with the water turned down to a trickle; later one would increase the flow rate, as it became apparent that the vessel was large and one could tolerate more spillover.

The ideal shape for the ramp is a growing exponential, but that is difficult to achieve in practice. However, the circuit of FIG. 12 produces a ramp-up shape that is at least approximately exponential. The action of the circuit is as follows: Before exposure, transistor 82 is held in saturation, shorting laser control node 84 to ground and keeping laser diode 70 off. To begin the exposure, 82 is turned off, allowing current sink 78 to charge laser control node 84 negatively. The circuit then proceeds through three distinct regimes of operation:

1. As the voltage on laser control node 84 falls, the voltage across laser diode 70 increases roughly linearly. During this time, laser diode 70 is in LED mode, where the light output is roughly proportional to the current it. Since this current increases exponentially with increasing voltage across laser diode 70, the light output increases exponentially with time.

2. When the voltage across laser diode 70 reaches about 2 V, laser diode 70 conducts enough that its impedance is smaller than ballast resistor 76; thus as the voltage on the laser control node continues to fall, most of the further drop occurs across resistor 76, causing the current to ramp up roughly linearly. Even before laser diode 70 reaches its threshold current, its light output begins to increase at a rate faster than linear, thus continuing the roughly exponential increase in light intensity.

3. When the light output of laser diode 70 is sufficient to cause a photocurrent through monitor photodiode 72 that is comparable to current sink 78, the ramp rate begins to slow, since the photocurrent opposes current sink 78. The circuit reaches equilibrium at the point where the photocurrent balances out current sink 78. This balance point is precise since no other circuit element is draining a significant current from laser control node.84. Thus, the circuit reaches equilibrium in a light-feedback mode, where only the small drifts in current sink 78 and the monitor photodiode affect the light output.

We claim:

1. A driver circuit for ramping the light output of a diode laser having a laser diode element and a monitor photodiode element between a predetermined minimum and a predetermined maximum, comprising:

a current source;

source follower means operably coupled to said current source and said laser diode for activating said laser diode;

a shunting capacitor operably coupled to said current source and source follower for controlling the dynamics of said circuit as the light output of said diode laser is ramped between said predetermined minimum and said predetermined maximum, wherein the connection of the capacitor, current source and source follower comprises a current summing node adapted for stabilizing said laser diode output by feedback of current from said monitor photodiode to said current summing node.

2. The driver circuit as claimed in claim 1, said source follower comprising a MOSFET transistor.

3. The driver circuit as claimed in claim 2, said source follower further comprising a ballast resistor coupled in series with the output of said MOSFET transistor, whereby said ballast resistor produces a controlled transconductance between said current summing node and said laser diode.

4. The driver circuit as claimed in claim 1, including means for ramping the light of said diode laser from said predetermined minimum to said predetermined maximum in an approximately exponentially increasing manner.

* * * * *

UNITED STATES PATENT AND TRADEMARK OFFICE
CERTIFICATE OF CORRECTION

PATENT NO. : 5,821,527
DATED : October 13, 1998
INVENTOR(S) : Rudd et al.

It is certified that error appears in the above-identified patent and that said Letters Patent is hereby corrected as shown below:

Column 5, line 64, delete "Ms)" and insert --ms)--.

Column 8, line 48, delete "VB" and insert --$V_B$--.

Signed and Sealed this

Sixteenth Day of March, 1999

Attest:

Q. TODD DICKINSON

Attesting Officer     Acting Commissioner of Patents and Trademarks